US008624433B2

(12) United States Patent
Whitted et al.

(10) Patent No.: US 8,624,433 B2
(45) Date of Patent: *Jan. 7, 2014

(54) DATA CENTER UNINTERRUPTIBLE POWER DISTRIBUTION ARCHITECTURE

(75) Inventors: William Whitted, Woodside, CA (US);
Montgomery Sykora, Denver, CO (US);
Ken Krieger, Jackson, WY (US);
Benchiao Jai, Mountain View, CA (US);
William Hamburgen, Palo Alto, CA (US); Jimmy Clidaras, Los Altos, CA (US); Donald L. Beaty, Red Bank, NJ (US); Gerald Aigner, Plaeffikon (CH)

(73) Assignee: Exaflop LLC, Mountain View, CA (US)

( * ) Notice: Subject to any disclaimer, the term of this patent is extended or adjusted under 35 U.S.C. 154(b) by 770 days.

This patent is subject to a terminal disclaimer.

(21) Appl. No.: 12/432,567

(22) Filed: Apr. 29, 2009

(65) Prior Publication Data

US 2009/0206670 A1 Aug. 20, 2009

Related U.S. Application Data

(63) Continuation of application No. 11/756,939, filed on Jun. 1, 2007, now Pat. No. 7,560,831.

(60) Provisional application No. 60/810,449, filed on Jun. 1, 2006.

(51) Int. Cl.
*H02J 9/00* (2006.01)

(52) U.S. Cl.
USPC .............................................. 307/66; 307/64

(58) Field of Classification Search
USPC ................. 307/64–66; 323/282; 361/600–602
See application file for complete search history.

(56) References Cited

U.S. PATENT DOCUMENTS 3,757,131 A 9/1973 Krutz et al.
4,809,151 A 2/1989 Ota
(Continued)

FOREIGN PATENT DOCUMENTS

CN 1053161 A 7/1991
CN 1246748 A 3/2000
(Continued)

OTHER PUBLICATIONS

Notification of Transmittal of the International Search Report and the Written Opinion of the International Searching Authority, or Declaration (3 pages); International Search Report (6 pages); and Written Opinion of the International Searching Authority (13 pages), mailed Jun. 26, 2009, for international application PCT/US2008/070475.

(Continued)

*Primary Examiner* — Fritz M Fleming
(74) *Attorney, Agent, or Firm* — Fish & Richardson P.C.

(57) ABSTRACT

Apparatus and associated method and computer program products involve a highly efficient uninterruptible power distribution architecture to support modular processing units. As an illustrative example, a modular processing unit includes an corresponding uninterruptible power system in which only one AC-to-DC rectification occurs between the utility AC grid and the processing circuit (e.g., microprocessor) loads. In an illustrative data center facility, a power distribution architecture includes a modular array of rack-mountable processing units, each of which has processing circuitry to handle network-related processing tasks. Associated with each modular processing unit is an uninterruptible power supply (UPS) to supply operating power to the network processing circuitry. Each UPS includes a battery selectively connectable across a DC bus, and a AC-to-DC rectifier that converts an AC input voltage to a single output voltage on the DC bus. The regulated DC bus voltage may be close to the battery's fully charged voltage.

25 Claims, 7 Drawing Sheets

(56) References Cited

U.S. PATENT DOCUMENTS

| | | | |
|---|---|---|---|
| 5,119,014 | A | 6/1992 | Kronberg |
| 5,458,991 | A | 10/1995 | Severinsky |
| 5,579,522 | A | 11/1996 | Christeson et al. |
| 5,694,307 | A | 12/1997 | Murugan |
| 5,715,154 | A | 2/1998 | Rault |
| 5,789,828 | A | 8/1998 | Tremaine et al. |
| 5,821,636 | A | 10/1998 | Baker et al. |
| 5,844,884 | A | 12/1998 | Szlenski |
| 6,009,177 | A | 12/1999 | Sudia |
| 6,076,142 | A | 6/2000 | Corrington et al. |
| 6,157,168 | A | 12/2000 | Malik |
| 6,225,708 | B1 | 5/2001 | Furukawa et al. |
| 6,289,684 | B1 | 9/2001 | Guidry et al. |
| 6,366,919 | B2 | 4/2002 | O Kane et al. |
| 6,374,627 | B1 | 4/2002 | Schumacher et al. |
| 6,429,706 | B1 | 8/2002 | Amin et al. |
| 6,496,366 | B1 | 12/2002 | Coglitore et al. |
| 6,506,111 | B2 | 1/2003 | Sharp et al. |
| 6,584,559 | B1 | 6/2003 | Huh et al. |
| 6,617,708 | B2 | 9/2003 | Boost |
| 6,652,373 | B2 | 11/2003 | Sharp et al. |
| 6,652,374 | B2 | 11/2003 | Sharp et al. |
| 6,667,891 | B2 | 12/2003 | Coglitore et al. |
| 6,668,565 | B1 | 12/2003 | Johnson et al. |
| 6,741,467 | B2 | 5/2004 | Coglitore et al. |
| 6,768,222 | B1 | 7/2004 | Ricks |
| 6,822,859 | B2 | 11/2004 | Coglitore et al. |
| 6,824,362 | B2 | 11/2004 | Dodson |
| 6,850,408 | B1 | 2/2005 | Coglitore et al. |
| 6,859,366 | B2 | 2/2005 | Fink |
| 6,880,349 | B2 | 4/2005 | Johnson et al. |
| 6,935,130 | B2 | 8/2005 | Cheng et al. |
| 6,937,947 | B2 | 8/2005 | Trembley |
| 6,967,283 | B2 | 11/2005 | Rasmussen et al. |
| 6,969,922 | B2 | 11/2005 | Welches et al. |
| 6,985,357 | B2 | 1/2006 | Cauthron |
| 7,011,576 | B2 | 3/2006 | Sharp et al. |
| 7,123,477 | B2 | 10/2006 | Coglitore et al. |
| 7,145,772 | B2 | 12/2006 | Fink |
| 7,173,821 | B2 | 2/2007 | Coglitore |
| 7,560,831 | B2 * | 7/2009 | Whitted et al. .................. 307/64 |
| 2003/0133263 | A1 | 7/2003 | Shu |
| 2003/0197428 | A1 | 10/2003 | Hatton et al. |
| 2003/0237008 | A1 | 12/2003 | Freevol et al. |
| 2004/0020224 | A1 | 2/2004 | Bash et al. |
| 2004/0150374 | A1 | 8/2004 | Kraus |
| 2004/0210800 | A1 | 10/2004 | Ghislain Gabriel Vecoven et al. |
| 2005/0012395 | A1 | 1/2005 | Eckroad et al. |
| 2005/0036248 | A1 | 2/2005 | Klikic et al. |
| 2005/0088201 | A1 | 4/2005 | Devlin et al. |
| 2005/0099750 | A1 | 5/2005 | Takahashi et al. |
| 2005/0170770 | A1 | 8/2005 | Johnson et al. |
| 2005/0174678 | A1 | 8/2005 | Zayas et al. |
| 2005/0182981 | A1 | 8/2005 | Hayashi |
| 2005/0286191 | A1 | 12/2005 | Vorenkamp et al. |
| 2006/0020832 | A1 | 1/2006 | Hung |
| 2006/0082263 | A1 | 4/2006 | Rimler et al. |
| 2006/0187600 | A1 | 8/2006 | Brown et al. |
| 2007/0047195 | A1 | 3/2007 | Merkin et al. |

FOREIGN PATENT DOCUMENTS

| | | |
|---|---|---|
| EP | 1 355 404 A | 10/2003 |
| WO | WO 2007/139577 | 12/2007 |

OTHER PUBLICATIONS

JP Patent 11-225835 to Kira et al.—English translation, Aug. 24, 1990 (15 pages).
Guralp Systems, "Serial Server/UPS" Sep. 7, 2005 (11 pages).
International Search Report and Written Opinion for International Application PCT/US2006/024880, mailed Feb. 15, 2008, 14 pages.
"Protect High-Density Equipment From Thermal Damage—Guaranteed," APC Currents, vol. 18, No. 4, Sep. 2007, 3 pages.
'Circuit Converts PWM Fan Drive to Linear and Reduces Acoustic Noise' [online]. Maxim/Dallas Semiconductor, 2006, [retrieved on Oct. 23, 2006]. Retrieved from the Internet: <URL: www.maxim-ic.com/appnotes.cfm/an_pk/3530, 3 pages.
'Intelligent Temperature Monitor and PWM Fan Controller' [online]. Analog Devices, 2003, [retrieved on Oct. 24, 2006]. Retrieved from the Internet: <URL: www.analog.com/ UploadedFiles/Data_Sheets/ADM1030.pdf#xml=http://search.analog.com/search/pdfPainter.aspx?url=http://www.analog.com/UploadedFiles/Data_Sheets/ADM1030.pdf&fterm=Intelligent&fterm=Temperature&fterm=Intelligent Temperature&la=en>, 28 pages.
'LM64—+—1C Remote Diode Temperature Sensor with PWM Fan Control and 5 GPIO's' [online]. National Semiconductor, 2006, [retrieved on Oct. 23, 2006]. Retrieved from the Internet: <URL: http://www.elecdesign.com/Articles/Index.cfm?ArticleID=6281>, 3 pages.
'Low-cost fan manager for power-supply applications' [online]. Electronic Design, 2006, [retrieved on Oct. 23, 2006]. <URL: www.elecdesign.com/Articles/Index.cfm?ArticleID=6281>, 3 pages.
System Management Interface Forum, "PMBus Power System Management Protocol Specification Part 1—General Requirements, Transport and Electrical Interface, Revision 1.0" Mar. 2005, 17 pages.
'T10 Project 1142D—Working Draft SCSI Parallel Interface-2' [online]. American National Standard, 1998, [retrieved on Oct. 23, 2006]. Retrieved from the Internet: <URL: www.t10.org/ftp/t10/drafts/spi2/spi2r20b.pdf >, pp. 181-182.
Cringley, Robert, "Google-Mart: Sam Walton Taught Google More About How to Dominate the Internet Than Microsoft Ever Did," I, Cringely—The Pulpit, Nov. 17, 2005, 3 pages.
Greg Matter Weblog, The Industrial Revolution, Finally, available at: http://blogs.sun.com/Gregp/date/200610, Oct. 17, 2006, 5 pages.
Hamilton, James, "An Architecture for Modular Data Centers" Microsoft Corp,CIDR 2007. 3rd Biennial Conference on Innovative Data Systems Research (CIDR) Jan. 7-10, 2007, Asilomar, California, USA pp. 306-313.
Hamilton, James, "Commodity Data Center Design" Microsoft Corp, Apr. 17, 2007, 11 pgs.
Rackable Systems, "Rackable Systems Contcentro Modular Data Center High Density, High Efficiency Mobile Computing," Datasheet, 2007, 1 page.
Rackable Systems, "Thermal Management & Server Density: Critical Issues for Today's Data Center," White paper, 2004 8 pages.
Sanmina—Sci Product Sheet, ECOBAY, "High-Performance Closed-Loop System," 2006, 2 pages.
Shankland, Stephen, "Sun Blackbox, meet APC's whitebox," cNet News.com, available at http://news.com.com/Sun+Blackbox%2C+meet+APCs+whitebox/2001-1010_3-617774.html, Jan. 7, 2007, 2 pages.
SUN Project Blackbox—Index, Available at: http://www.sun.com/emrkt/blackbox/index.jsp, Retrieved Oct. 19, 2006, 3 pages.
SUN Project Blackbox—Scenarios, Available at: http://www.sun.com/emrkt/blackbox/scenarios.jsp, Retrieved Oct. 19, 2006, 7 pages.
Office Action for U.S. Appl. No. 11/779,606, mailed Jan. 21, 2010, 17 pages.
Final Office Action for U.S. Appl. No. 11/779,606, mailed Jun. 24, 2010, 19 pages.
Office Action for U.S. Appl. No. 11/779,606, mailed Nov. 26, 2010, 19 pages.
Notice of Allowance for U.S. Appl. No. 11/756,939, mailed Jan. 29, 2009, 12 pages.
International Search Report and Written Opinion for International Application No. PCT/US2006/039928, mailed Aug. 3, 2007, 8 pages.
International Search Report and Written Opinion for International Application No. PCT/US2006/039715, mailed Nov. 5, 2007, 12 pages.
Notification of the First Office Action from The State Intellectual Property Office of the People's Republic of China (16 pages), mailed May 12, 2010, for related Chinese application 200680055429.4.
Chonghui Li, "Application of Automatic Changeover Switch in UPS Power Supply System" Financial Computing in China, Issue $3^{rd}$, 2005, pp. 69-70.

(56) References Cited

OTHER PUBLICATIONS

"Distributed Monitoring System of Communication Power Supply" Siwel Gu, China Master Theses Full-Text Database, Information Technology Series, Issue $3^{rd}$, 2003, pp. 7-8.

First Office Action for corresponding Chinese Application No. 200880106672.3, mailed May 3, 2012, 11 pages.
Taiwan Office Action issued in Application No. 095123118 on Oct. 24, 2013, with English Translation, 10 pages.

* cited by examiner

DATA CENTER UNINTERRUPTIBLE POWER DISTRIBUTION ARCHITECTURE

CROSS-REFERENCE TO RELATED APPLICATIONS

This application is a continuation application under 35 U.S.C. §120 of U.S. patent application Ser. No. 11/756,939, filed Jun. 1, 2007, entitled "Data Center Uninterruptible Power Distribution Architecture", which claims the benefit under 35 U.S.C. §119 of U.S. provisional application No. 60/810,449, filed Jun. 1, 2006. The entire contents of U.S. patent application Ser. No. 11/756,939 and U.S. provisional application No. 60/810,449 are incorporated by reference as if fully set forth herein.

TECHNICAL FIELD

The following disclosure relates to a power distribution architecture for data centers, for example, techniques and associated apparatus to efficiently deliver uninterruptible power to scalable and/or modular data processing equipment.

BACKGROUND

Computers have become widely adopted for various applications, for both personal and corporate uses. Some computers operate as stand-alone data processing equipment, with perhaps a peripheral such as a printer and a display device. Although useful for many purposes, additional features and benefits may be achieved if multiple computers are networked together to share information and resources.

A computer network may be formed by connecting two or more computing devices with an information channel. One type of network is a local area network (LAN). A typical residential LAN, for example, may connect two computers to a printer. A typical corporate LAN, for example, may allow many users to share resources and large amounts of information, including databases and application software.

A second type of network is a wide area network (WAN). A prime example of a WAN is the Internet. WANs such as the Internet allow many computer devices to communicate messages and share information. When multiple LANs are interoperable with one or more WANs, opportunities for computing devices to communicate and share information greatly expand.

From the perspective of an individual computing device that is connected to a network, users may direct the communication of information over a network with a user interface generated by a web browser application. A web browser is typically configured to enable the user to access web sites on the Internet or the World Wide Web. Web browsers allow users to easily send and receive messages over a network in packets of information. Such packets of information may include the address of a search engine website, such as www-.dogpile.com, for example.

The popularity and simplicity of sharing information over networks, such as the Internet, has resulted in demand for data processing and storage capacity to support high network traffic volume. One mechanism to address this need may be referred to as a data center. In the context of the Internet, a data center may provide processing, storage, and support functions that improve performance or enhance the utility of the Internet. Data centers may also be deployed in other contexts. Financial institutions, for example, may employ one or more data centers to store financial account and transaction information.

A data center may provide data processing and storage capacity. In operation, a data center may be connected to a network, and may receive and respond to various requests from the network to retrieve, process, and/or store data. In addition to extensive data processing and data storage capabilities, data centers typically support high speed data transfer and routing capabilities. To meet future network demands, data center capacity may continue to expand.

SUMMARY

Apparatus and associated method and computer program products involve a highly efficient uninterruptible power distribution architecture to support modular processing units. As an illustrative example, a modular processing unit includes an uninterruptible power system in which only one AC-to-DC rectification occurs between the utility AC grid and the processing circuit (e.g., microprocessor) loads. In an illustrative data center facility, a power distribution architecture includes a modular array of rack-mountable processing units, each of which has processing circuitry to handle network-related processing tasks. Associated with each modular processing unit is an uninterruptible power supply (UPS) to supply operating power to the network processing circuitry. Each UPS includes a battery selectively connectable across a DC bus, and a AC-to-DC rectifier that converts an AC input voltage to a single output voltage on the DC bus. The regulated DC bus voltage may be close to the battery's fully charged voltage.

In some embodiments, a power distribution system for a data center includes a modular base configured to be supported in one of a plurality of positions on a rack mounting structure. The base can include a DC load comprising at least one digital processor operative to process data received over a network; a DC bus configured to deliver operating power to the DC load, the power being received from a power source connected across the DC bus; and an uninterruptible power supply (UPS) supported by the base. The UPS can include a battery circuit configured to operatively connect a battery across the DC bus during a fault condition in which an AC input voltage signal from an AC generator falls outside of a normal operating range; an AC-to-DC rectification stage comprising an AC-to-DC conversion circuit configured to convert the AC input voltage signal to a single DC output voltage signal across the DC bus when the AC input voltage signal is within the normal operating range, wherein the AC-to-DC conversion circuit is configured to regulate the DC output voltage signal to a voltage level above and substantially near a maximum nominal charge voltage of the battery; and a controller configured to selectively activate the AC-to-DC conversion circuit to resume supplying operating power to the DC load in response to a signal that indicates that the AC input voltage signal has returned to the normal operating range.

The controller can further control a switch to selectively connect the battery across the DC bus. In some implementations, the battery includes one or more cells electrically connected in series. In some implementations, the battery includes one or more cells electrically connected in parallel. The AC input voltage signal can be originated from one or more electric generator types selected from the group consisting of: a generator in an electric utility plant; a gas turbine; a steam turbine; a wind turbine; a water turbine; a solar cell; an electronic circuit; a flywheel; and, a fuel-powered motor-generator. The AC input voltage signal can include a phase voltage signal and a neutral signal from a three phase AC system.

In some implementations, the AC input voltage has an r.m.s. value of about 208 Volts. In some implementations, the AC input voltage has an r.m.s. value between about 85 Volts and at least about 480 Volts. In some implementations, the AC input voltage substantially comprises a sinusoidal waveform at frequency of between about 45 Hz and at least about 500 Hertz. In some implementations, the AC input voltage is connected to WYE-connected voltage source. In some implementations, the AC input voltage is connected to a DELTA-connected voltage source. A cell in the battery can include a battery chemistry selected from the group consisting of: lead acid; nickel metal hydride; nickel cadmium; alkaline; and, lithium ion.

The system can further include a charger configured to charge the battery through a path connected across the DC bus. In some implementations, the single DC bus voltage is less than about 26 Volts. In some implementations, the single DC bus voltage is between about 10 Volts and about 15 Volts. In some implementations, the single DC bus voltage is about 13.65 Volts. In some implementations, the AC-to-DC conversion circuit regulates the DC output voltage signal to approximately 1 Volt above the maximum nominal charge voltage of the battery. The DC bus voltage can provide sufficient voltage for a linear regulator connected in series with the battery across the DC bus to trickle charge the battery to a fully charged state according to battery specifications. The DC bus can include a first electrical path at a first voltage, and further comprises a second electrical path at a second voltage. In some implementations, one of the first and second voltages is substantially at a ground reference potential. In some implementations, the system has only one rectification circuit configured to convert an AC waveform to a DC waveform. In some implementations, a first terminal of the battery is configured to connect directly to a first rail of the DC bus, and the second terminal of the battery is selectively connected to a second rail of the DC bus.

The system can further include a data store, wherein the AC-to-DC converter resumes regulating the DC output voltage signal a delay time after the at least one processor receives a signal indicative of the removal of the fault in the AC voltage input signal, said delay time corresponding to a delay time parameter in the data store. One of the at least one digital processors can determine the stored delay time parameter. The stored delay time parameter can include a pseudo-randomly generated value.

In some implementations, the base can be configured for mounting in any available one of a plurality of positions in a rack or frame. The DC load can include a central processing unit, a data storage device, a math coprocessor, or a digital signal processor.

The system can further include at least one DC-DC converter configured to convert a voltage supplied on the DC bus to at least one additional DC voltage. In some implementations, the additional voltage is selected from the group consisting of: −5; 1; 3; 3.3; 5; 7.5; 10; about 18-20; and, about 20-26 Volts.

The DC load can further include one or more information-containing signals transmitted to a load external to the DC load and supported by the base. The transmitted signals can be transmitted through at least one medium selected from the group consisting of: a conductive channel; a wireless channel; and, an optical channel. The DC load can further include a data store containing delay time parameter information, wherein the controller is configured to activate the AC-to-DC conversion circuit to resume supplying power to the DC load a delay time after the controller receives a signal that indicates an end of the AC input voltage signal fault, said delay time corresponding to the delay time parameter information stored in the data store.

The DC bus can include a series element for detecting an electrical parameter. In some implementations, the series element includes a low value resistance. In some implementations, the battery circuit includes an element in series connection with the battery. The element in series with the battery can include a low value resistance. The element in series with the battery can include an inductor. The element in series with the battery can include a hall effect sensor.

In some implementations, a modular processing system with a distributed uninterruptible power architecture for a data center includes a plurality of rack mounting structures, each rack mounting structure comprising a plurality of tray locations; and a plurality of modular trays, each tray configured to be mounted in one of the plurality of tray locations.

In some implementations, each tray includes a DC load comprising at least one processor operative to process data received over a network; a DC bus configured to deliver operating power to the DC load, the power being received from a power source connected across the DC bus, wherein power delivered to the DC load is rectified from AC-to-DC at most one time; and an uninterruptible power supply (UPS) supported by the tray. In some implementations, the UPS includes a battery circuit configured to operatively connect a battery across the DC bus during a fault condition in which an AC input voltage signal falls outside of a normal operating range; a single AC-to-DC rectification stage comprising an AC-to-DC conversion circuit configured to convert the AC input voltage signal to a DC output voltage signal across the DC bus when the AC input voltage signal is within the normal operating range, wherein the AC-to-DC conversion circuit is configured to regulate the DC output voltage signal to a voltage level above and substantially near a maximum nominal charge voltage of the battery; and a controller configured to selectively activate the AC-to-DC conversion circuit to resume supplying operating power to the DC load in response to a signal that indicates that the AC input voltage signal has returned to the normal operating range.

In some implementations, a method of providing uninterruptible power to a motherboard in a data center includes connecting a DC bus to supply a single DC voltage to at least one DC load, each DC load comprising at least one processor; and operating an AC-to-DC converter when an AC input voltage signal from the electric utility grid is within a normal voltage range. The operating step can include converting the AC input voltage signal to a DC voltage on the DC bus, wherein the converting step comprises the only AC-to-DC rectification of electric power generated by the electric utility grid and delivered to the DC load; regulating the converted DC bus voltage to a set point voltage, the set point voltage being substantially close to a voltage in a nominal voltage range for a back-up battery; and in response to detecting a fault condition of the AC input voltage signal, connecting a battery circuit directly across the DC bus to enable the back-up battery in the battery circuit to provide operating power to the DC load such that the DC load continues to operate for a period of time after detecting the fault.

In some implementations, DC-to-AC conversion is not performed between the input to the AC-to-DC converter and the input to the DC load. In some implementations, the set point voltage is substantially close to a nominal fully charged voltage for the back-up battery. In some implementations, the method further includes continuously providing operating power to operate the DC load substantially without interruption for at least 10 seconds. In some implementations, the method further includes dynamically selecting the set point voltage based on operating conditions of the back-up battery. In some implementations, the method further includes detecting a fault condition of the AC input voltage signal.

In some implementations, an architecture for providing uninterruptible power to a plurality of data processors includes a DC bus to deliver operating power at a DC voltage; a processing unit electrically connected across the DC bus; an AC-to-DC converter that performs the only AC-to-DC rectification that occurs on power delivered to the DC bus from an AC generator; a battery; means for selectively connecting the battery across the DC bus; a processor; and a plurality of memory locations coupled to the processor to store executable instructions that, when executed by the processor, cause operations to be performed to control the connecting means. In some implementations, the operations include i) electrically connecting the battery across the DC bus in response to a fault condition on the AC mains voltage, wherein the battery supplies electric power to operate the DC load when the battery is electrically connected across the DC bus; and ii) electrically disconnecting the battery from across the DC bus in response to a stop discharge signal.

In some implementations, the stop discharge signal is generated in response to expiration of a fixed time interval, the interval being started in response to the fault condition on the AC mains voltage. In some implementations, the stop discharge signal is generated in response to an end of the fault condition on the AC mains voltage. The connecting means can include means for charging the battery. The connecting means can include means for discharging the battery across the DC bus to supply operating power to the DC load. In some implementations, the processing unit includes at least one processor. The processing unit can further include a tray. The processing unit can further include a rack. The processing unit can further include a building.

In some implementations, a computer program product is tangibly embodied in an information carrier and contains instructions that, when executed by a processor, cause the processor to perform operations to provide uninterruptible power to a plurality of data processors. The operations can include electrically connecting a battery across a DC bus in response to a fault condition on an AC mains voltage generated by an electric utility source, wherein the battery supplies electric power to the DC load when the battery is electrically connected across the DC bus; and electrically disconnecting the battery from across the DC bus in response to a stop discharge signal, wherein the DC bus is configured to deliver operating power to the DC load from the battery when the battery is electrically connected across the DC bus, and the DC bus is further configured to deliver operating power to the DC load from an AC-to-DC converter, wherein the AC-to-DC converter performs the only AC-to-DC rectification that occurs on power from an AC utility grid source that the AC-to-DC converter delivers to the DC bus.

In some implementations, the stop discharge signal is generated in response to expiration of a fixed time interval, the interval being started in response to the fault condition on the AC mains voltage. In some implementations, the stop discharge signal is generated in response to an end of the fault condition on the AC mains voltage.

In some implementations, a system for providing operating power to multiple processors in a data center includes a plurality of processing units. Each processing unit can include a DC load comprising at least one processor; and an uninterruptible power source (UPS) configured to deliver power to the DC load. The UPS can include an AC-to-DC converter for converting an AC signal to a DC voltage and for regulating the voltage on the DC bus, wherein the AC signal originates from an AC voltage generator, and wherein the AC-to-DC converter provides the only rectification from AC-to-DC between the AC voltage generator and the DC load; a battery; and a switch configured (1) to prevent the battery from discharging into the DC load when the AC signal is in the normal operating range, and (2) to connect the battery substantially in parallel with the DC load when the AC signal falls out of a normal operating range.

In some implementations, the AC-to-DC converter is configured to regulate the DC bus to between about 6 Volts and about 26 Volts. In some implementations, the AC-to-DC converter is configured to regulate the DC bus to between about 9 Volts and about 15 Volts. In some implementations, the AC-to-DC converter is configured to regulate the DC bus to about 13.65 Volts.

In some implementations, a method of facilitating data processing includes communicating over a network with at least one of a plurality of processing units in a data center. Each processing unit can include a DC load comprising at least one processor; and an uninterruptible power source (UPS) configured to deliver power to the DC load. The UPS can include an AC-to-DC converter for converting an AC signal to a DC signal and for regulating a voltage to the DC load, wherein the AC signal originates from an AC voltage generator, and wherein the AC-to-DC converter provides the only rectification from AC-to-DC between the AC voltage generator and the DC load; a battery; and a switch configured (1) to prevent the battery from discharging into the DC load when the AC signal is in the normal operating range, and (2) to connect the battery substantially in parallel with the DC load when the AC signal falls out of a normal operating range. The processing unit further can further include a tray configured to support the DC load. The processing unit can further include a rack. The processing unit can further include a building.

Some embodiments may provide one or more advantages. For example, a single rectification UPS architecture may substantially reduce complexity and parts count, and may increase expected mean time between failures. In addition, manufacturing flexibility and component procurement and/or volume pricing benefits may be achieved for such a system. In some embodiments, a modular architecture can facilitate reduced material and/or labor costs for installing, maintaining, and/or replacing data center processing units. Moreover, low cost, light weight, high volume modular processing units with corresponding uninterruptible power supplies may be quickly deployed or re-deployed, as needed, in scalable systems or in a wide range of facilities. Some embodiments may also provide hot-swap capabilities. Various implementations may substantially improve electrical power conversion efficiency, for example, by providing a modular processing unit with an uninterruptible power system in which only a single AC-to-DC rectification occurs between the utility mains and the microprocessor. Improved power conversion efficiency may yield substantial energy savings, which may yield further benefits such as reduced conductor (e.g., copper) requirements and reduced thermal (e.g., air conditioning) loads, for example.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
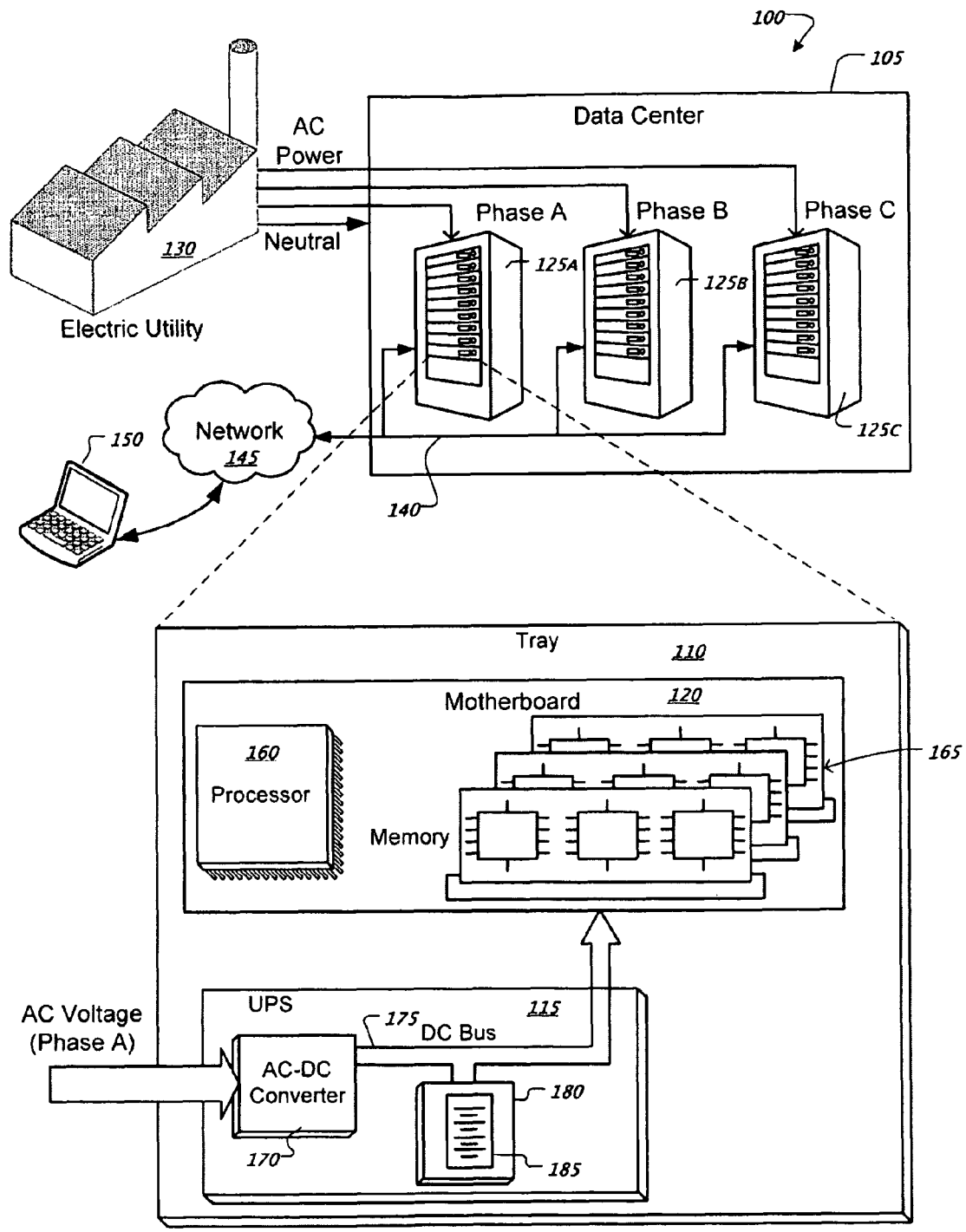
FIG. 1 is a schematic diagram illustrating an exemplary power distribution architecture for a data center in which each of a number of modular rack-mounted trays includes an uninterruptible power supply (UPS) and a computer motherboard.

FIG. 1 is a schematic diagram illustrating an exemplary power distribution architecture 100 for a data center 105 in which each of a number of modular rack-mounted bases (which may also be referred to as trays) 110 includes an uninterruptible power supply (UPS) 115 and a computer motherboard 120. Efficient power delivery may be achieved by configuring the UPS 115 to perform the only AC-to-DC rectification that occurs between the AC mains power received from the electric utility grid and the DC power consumed by the motherboard 120. In this example, AC mains refers to the AC power source available at the point of use in the data center 105. When received in the data center 105 at the UPS 115, the AC mains voltage is a substantially sinusoidal AC signal (e.g., 50 Hz, 60 Hz) that was generated, transmitted, and distributed by the electric utility. The AC mains input voltage is converted to a single DC voltage on a DC bus that delivers operating power to the motherboard 120. In the event of a fault on the AC mains, a battery circuit is electrically connected across the DC bus to supply operating power to the motherboard 120.

In the depicted example, the data center 105 includes a number of racks 125A, 125B, 125C that contain a number of the trays 110. The racks 125A-125C may be powered by three phase AC power line voltages that are delivered to the data center 105 from an electric utility 130. The AC power line voltages delivered to each of the racks 125A-125C may originate from an AC generator (e.g., operated by the electric utility). The AC voltage signals, which are substantially sinusoidal, may be transmitted to a distribution point, such as a substation (not shown) in the utility grid, for example. The power line voltages (e.g., 480 V line-to-line) may be distributed from the substation to the data center 105. In the data center 105, individual phase voltages (e.g., 208 V line-to-neutral) are routed to the individual racks 125A-125C. Suitable AC-to-AC transformers (not shown) may be employed, as necessary, to deliver the AC power at a specified AC voltage. For example, step-down transformers may transform AC power from high voltage levels suitable for transmission to levels that can be substantially directly applied to the UPS 115. In some three phase configurations, for example, such transformers may make appropriate transformations between WYE and DELTA connections if required.

Unless otherwise indicated, references to AC voltages are understood to refer to substantially sinusoidal voltages, and voltage amplitudes are understood to refer to root mean square (r.m.s.) values. The utility 130 may deliver substantially symmetric three phase voltages suitable for powering substantially balanced three phase loads.

In the depicted example, one phase voltage and a neutral line are distributed to each rack 125. The racks 125 and trays 110 may be configured in to form a substantially balanced load. In other embodiments, a similar distribution may be used if the data center 105 included additional (or fewer) racks 125. As an example, the exemplary tray 110 (shown in magnified detail) in the rack 125A receives a phase A voltage and the neutral line. Each of the trays 110 in the rack 125A receives the same AC input voltage signal, namely the Phase A-to-neutral voltage.

Similarly, each of the trays 110 in the rack 125B receives a Phase B-to-neutral as the AC input voltage signal, and each of the trays 110 in the rack 125C receives Phase C-to-neutral as the AC input voltage signal. In other implementations, different phase voltages may be distributed among the trays 110 in one of the racks 125A-125C, and/or the AC input voltage signal to each of the trays 110 may be line-to-line voltages instead of line-to-neutral voltages. In various embodiments, any practical number of phases (e.g., 1, 2, 3, 4, 5, 6, . . . 12 or more) may be distributed to provide operating power to individual trays 110.

Each of the trays 110 in the depicted example is coupled to a network connection 140. The network connection 140 provides an information channel to a network 145, which may include, for example, a local area network, virtual private network, wide area network (e.g., the Internet), or a combination of such networks, which may be wired, fiber optic, and/or wireless. A remote computer 150 represents one of many possible devices that could communicate data directly or indirectly with one or more trays to access, store, process, and/or retrieve information using a processor 160 and associated memory 165 on the motherboard 120. In some implementations, additional processors (e.g., servers) may facilitate such communication. For example, the exemplary remote computer device 150 may be included in a server, a desktop computer, a laptop computer, and/or a handheld processor-based device. One or more servers may pre- or post-process, supervise, route, and/or balance the flow of data associated with the communication.

In various embodiments, the motherboard 120 may include two, three, four, or any other practicable number of processors 160. In some embodiments, the motherboard 120 may be replaced with tray of data storage devices (e.g., hard disc drives, flash memory, RAM, or any of these or other types of memory in combination). In such embodiments, the data storage devices and the UPS 115 with the battery 185 may be supported on the tray 110. In various embodiments, a digital processor may include any combination of analog and/or digital logic circuits, which may be integrated or discrete, and may further include programmable and/or programmed devices that may execute instructions stored in a memory. The memory 165 may include volatile and/or non-volatile memory that may be read and/or written to by the processor 160. The motherboard 120 may further include some or all of a central processor unit(s) (CPU), memory (e.g., cache, non-volatile, flash), and/or disk drives, for example, along with various memories, chip sets, and associated support circuitry.

In some embodiments, the motherboard 120 may provide one or more DC-to-DC converters to convert the DC bus voltage to a suitable voltage for operating the circuitry in the motherboard 120. For example, one or more DC-to-DC converters may provide regulated output voltages, which may include, for example. a +3.3VDC power signal, a +5VDC power signal, a −5VDC power signal, a +12VDC power signal, and a −12VDC power signal.

In an exemplary implementation, the processor 160 and the memory 165 on the motherboard 120 may form at least a part of a processing system configured to handle network operations. As an illustrative example, the motherboard 120 may help to process Internet requests. The motherboard may process information either alone or in combination with other parallel processes running on other processor-based devices, such as one or more other trays 110 in the data center 105.

An AC input voltage signal is delivered to each of the trays 110 to be processed by the UPS 115. In some examples, the AC input voltage signal may be received from the AC mains. The UPS 115 includes an AC-to-DC converter 170 that converts the AC input voltage signal to a regulated DC voltage. The converter 170 outputs the regulated DC voltage onto a DC bus 175. In some embodiments, the AC-to-DC converter 170 may regulate the DC voltage to a static set point. In some other embodiments, the set point may be dynamically determined. In some of the static and dynamic embodiments, the set point may be based on a characteristic of the battery. Examples of such set point regulation will be described in additional detail with reference to FIG. 3.

The AC-to-DC converter 170 may maintain voltage regulation on the DC bus 175 when the AC input voltage signal is in a normal range. A normal range for a typical sinusoidal AC signal may be specified in various ways. For example, one or more thresholds may be specified between about 80 V and 500 V for line frequencies that may be between about 40 Hz and 1000 Hz, such as around 50 Hz, 60 Hz, 100 Hz, 200 Hz, 300 Hz, 400 Hz, 500 Hz, . . . , and up to about 1000 Hz or more. As an illustrative example, for a 120 V nominal AC input voltage signal, a fault may be identified if the AC peak input voltage falls below a first threshold of 90 V in any half cycle, or if the r.m.s. voltage drops below a second threshold of 100 V for a predetermined amount of time. Fault conditions may include, without limitation, blackouts, brownouts, voltage sags, surges, instabilities related to switchgear operation, or other electrical transient associated with the AC mains. In some implementations, a fault condition may cause or potentially cause improper operation of a processing unit in the DC load, for example, if the AC-to-DC converter 170 is unable to maintain adequate regulation of the voltage on the DC bus 175, and/or to supply sufficient current to operate the DC loads serviced by the DC bus 175.

If the AC input voltage signal falls outside of a normal range, such as during a fault condition, a detection circuit (not shown) may send a signal indicative of this condition. In response to detecting the fault condition, a battery circuit 180 may be configured to connect a battery 185 across the DC bus 175 so that the motherboard 120 can continue to operate substantially without interruption. The battery 185 may continue to provide operating power to the circuits on the motherboard 115 until the battery 185 substantially discharges. The battery circuit 180 may include circuitry capable of controlling the charging and/or discharging the battery across the DC bus 175 in various operating modes. An exemplary battery circuit is described in further detail with reference to FIGS. 5A, 5B.

Figure 2:
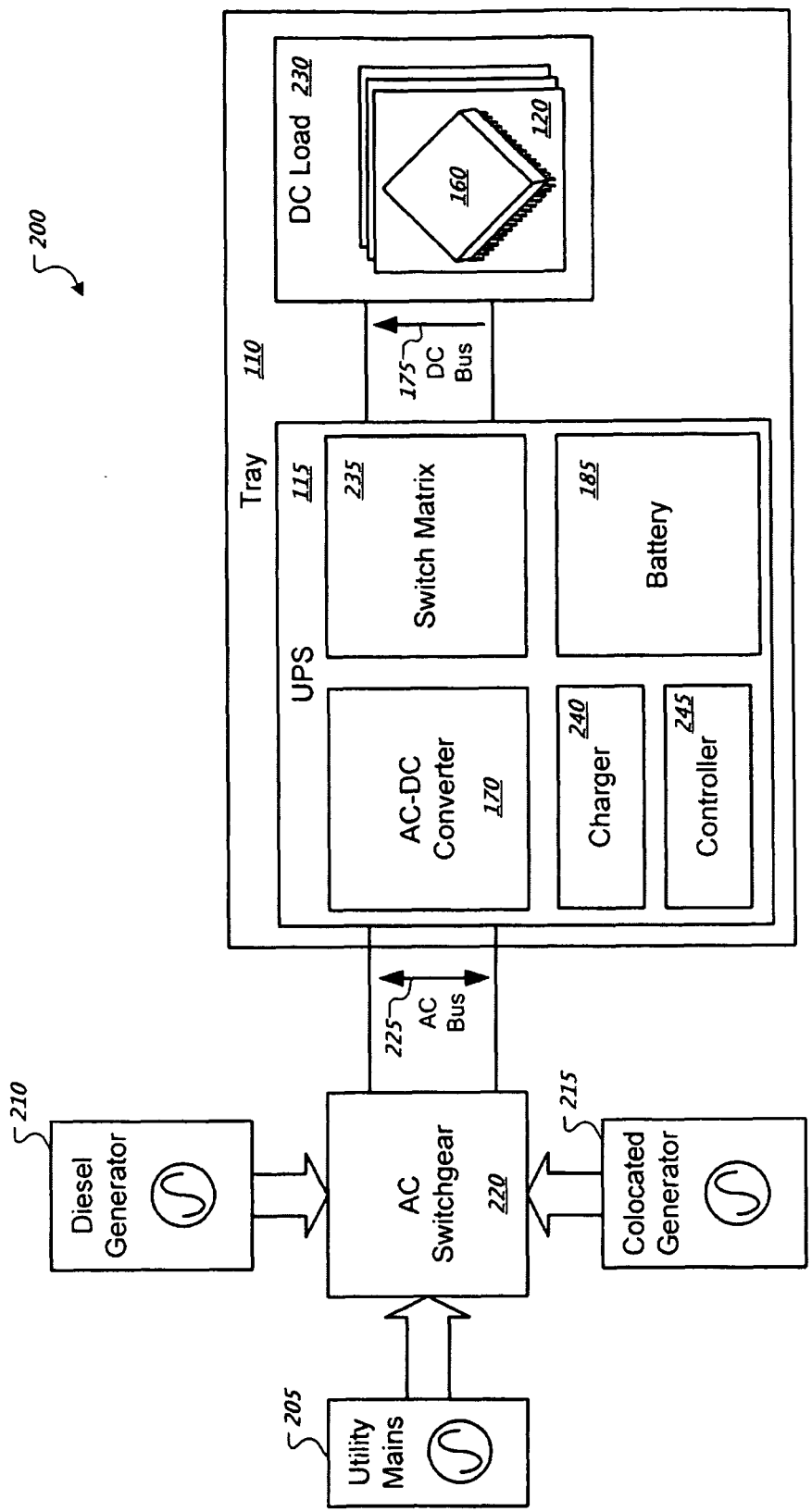
FIGS. 2-4 are block diagrams that illustrate exemplary power distribution architectures for delivering power to operate DC loads that have a processor.
Figure 3:
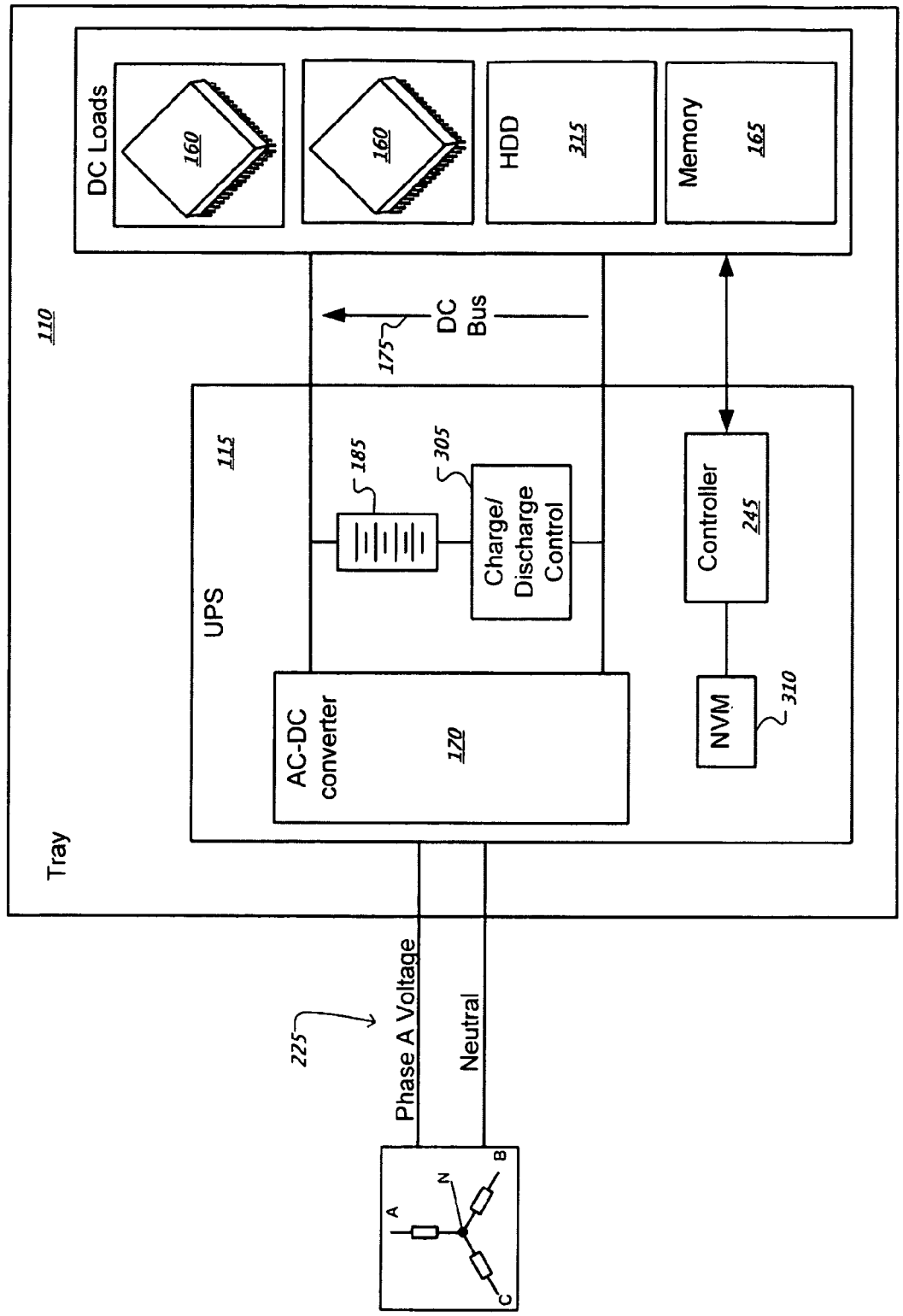
Figure 4:
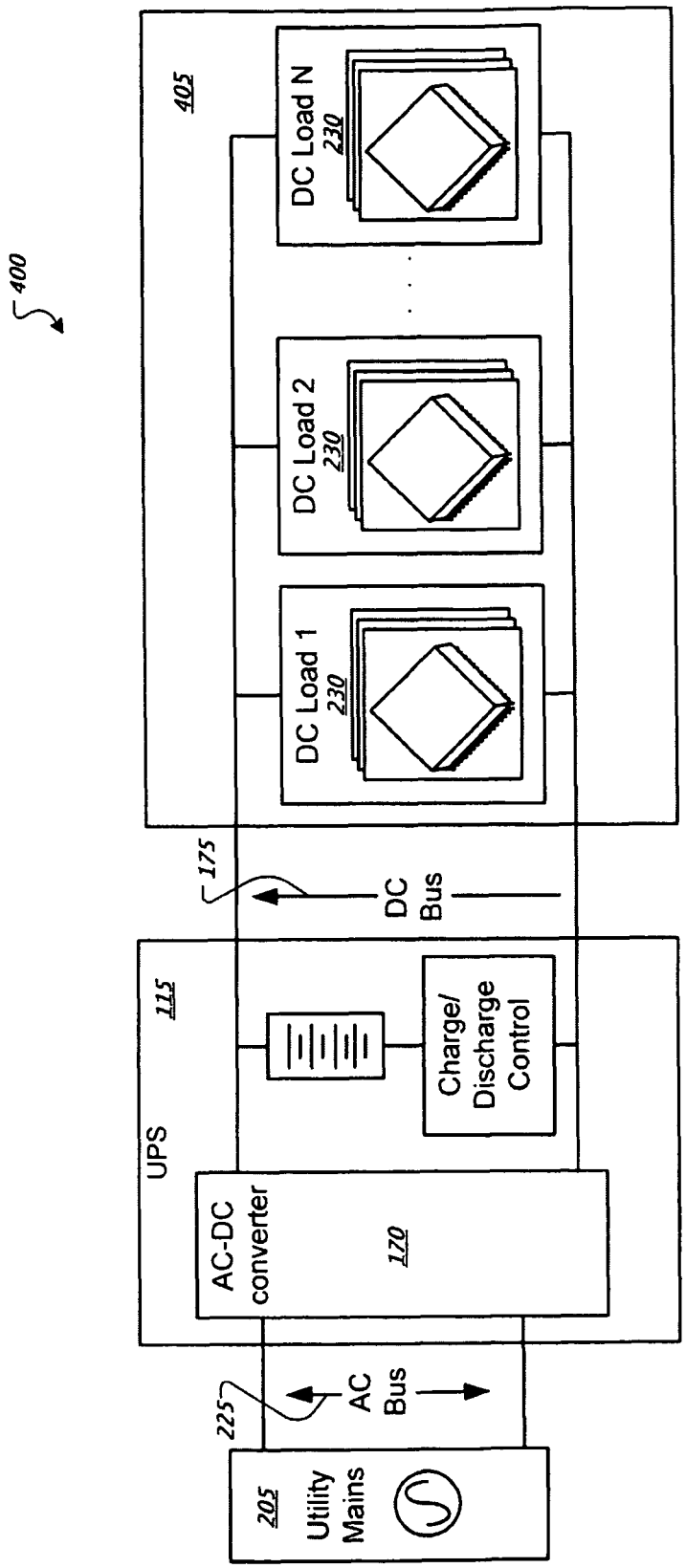

FIGS. 2-4 are block diagrams that illustrate exemplary power distribution architectures for delivering power to operate DC loads that have at least one processor. For example, the motherboard 120 may constitute a DC load in various embodiments. In these examples, the AC-to-DC converter 170 provides the only AC-to-DC rectification that occurs between the AC utility grid (e.g., substation transformer, transmission line, generator, and the like) and the microprocessor 160 in any of the trays 110.

FIG. 2 shows an exemplary power distribution architecture in a system 300, which may be implemented in a large facility with large power requirements, for example. The system 200 includes a utility AC mains generator 205 to supply AC mains voltage from a utility such as the electric utility 130. The exemplary system 200 also includes two back-up AC generators, including a diesel fuel powered generator 210 and a co-located (e.g., turbine) generator 215. Power from the generators 205, 210, 215 may be combined and/or selected by the AC switchgear 220, and then delivered to the tray 110 via an AC bus 225. In the event of a fault on the AC mains from the generator 205, the generators 210, 215 may provide a backup AC input voltage signal on the AC bus 225.

In some implementations, a substantially asynchronous energy source may be used to generate a substantially sinusoidal AC voltage signal. For example, a flywheel energy storage and recovery system may be used. Wind or solar generated energy, such as that provided by a wind farm or a solar farm, respectively, may serve as sources of energy to generate a substantially sinusoidal AC voltage in an electric utility grid. In such implementations, the generated substantially sinusoidal signal is transmitted through the utility grid to an input of the AC-to-DC converter 170 without intervening AC-to-DC rectification.

In cooperation with the battery backup provided by the battery 185, the generators 205, 210, 215 may provide substantially uninterruptible power to operate a DC load 230 on the tray 110 for short, intermediate, and/or longer term periods.

An exemplary use of the generators 210, 215 may be illustrated in the event of a fault (e.g., brownout, blackout) or unavailability (e.g., circuit maintenance) of the AC mains voltage from the generator 205. In response to detecting the fault on the AC input voltage signal, the battery 185 is connected to deliver substantially battery voltage across the DC bus 175. As such, short term (e.g., at least 10, 20, 30, 40, 50, 60 seconds at full load) operation of the DC load is maintained by power supplied from the battery 185. The diesel generator 210 may be started to provide power to the AC bus 225, preferably before the battery 185 fully discharges. For more extended AC power faults, the co-located generator 215 may be brought on-line to provide a more cost-effective operation, or to avoid exceeding government-regulated limits on diesel fuel generation.

In some implementations, one or both of the generators 210, 215 may provide peak load shedding capability. For example, the co-located generator 215 may be used during expected peak demand hours each day. In some cases, this may permit negotiation of preferential rates for electric power from the electric utility 130.

FIG. 3 shows an exemplary schematic in additional detail. In various embodiments, the AC-to-DC converter 170 may regulate the single output voltage on the DC bus to a set point. The set point may be a static value in some embodiments, or it may be dynamically determined during operation. For example, the set point may be based, at least in part, on one or more electrical characteristics of the battery.

Characteristics on which a set point can be established may include battery characteristics such as battery chemistry, battery age, charge/discharge history, nominal maximum charge, temperature, charging profile (e.g., voltage charge rate under constant current), estimates of battery internal impedance, or other parameters relating to the electrical performance of the battery.

In addition to internal battery characteristics, the set point may be based at least in part on electrical circuit parameters of the battery circuit 180 and the DC bus 175. In some embodiments, the set point to which the AC-to-DC converter 170 regulates the voltage on the DC bus 175 can be a function of a battery charging circuit topology. If the battery charging circuit provides a voltage boost circuit (e.g., boost converter, charge pump, flyback), then the set point voltage may be substantially at or below a desired maximum charge voltage. If the battery charging circuit only provides a voltage step-down (e.g., linear regulator, buck converter) capability, then the set point can be set to a value sufficiently above the maximum nominal charge voltage to achieve the required charge performance over relevant temperatures, taking account of tradeoffs in power loss and charging current and corresponding charge time. In light of such trade-offs, the set point may be only as high as necessary to meet charge time specifications. For example, the set point may be set to between about 0.050 and about 1 Volt above the nominal expected battery voltage.

In various embodiments, the set point voltage may be set based on a specified temperature, such as 0, 10, 25, 30, 40, 50, . . . , 80 degrees Celsius. In an illustrative example, the set point may be dynamically adjusted based on a temperature in or around the battery 185 as measured by at least one temperature sensor (not shown).

In the depicted embodiment, the UPS 115 includes a charge/discharge control circuit 305 in series connection with the battery 185, and further includes the controller 245 in operative connection with a non-volatile memory (NVM) 310.

The series connected battery 185 and circuit 305 are connected across the DC bus 175. Responsive to a signal indicative of a fault on the AC input voltage signal, the circuit 305 can operatively connect the battery 185 across the DC bus 175 to permit the battery to discharge to the DC load 230 through a low impedance path. When the AC input voltage signal on the AC bus 225 is not faulted, the circuit 305 may selectively permit charging current to flow from the DC bus 175 to charge the battery 185. If multiple batteries or battery strings are connected in electrical parallel, individual strings or groups of strings may be independently charged at different rates according to a defined charging algorithm.

In the depicted embodiment, the NVM 310 may store set point information for regulating the output of the AC-to-DC converter 170. The set point information may be stored during manufacturing time, upon first use, and/or dynamically updated during operation of the tray 110. The controller 245 and/or the AC-to-DC converter 170 may read and/or use the stored set point information to determine how to control the AC-to-DC converter 170. In addition to set point information, information about threshold conditions for switching over between AC input and battery operation may be stored in the NVM 310, for example.

Access to information stored in the NVM 310 may be provided through a serial or parallel interface (which may have a wired and/or infrared physical layer), for example, between the NVM 310 and one or more processors 160 on the DC load 230. The processors 160 may be used to access and/or update information in the NVM 310 via the network connections 140 (FIG. 1) to each tray 110.

Additional data storage devices may be provided on the DC load 230. In the depicted example, the DC load 230 includes two processors 160 in operative connection with the memory 165 and a hard disc drive (HDD) 315.

FIG. 4 illustrates an exemplary power distribution architecture 400 on the rack 125. In the architecture 400, the UPS 115 delivers power through the DC bus 175 to multiple DC loads 230 in a processing unit 405. Each DC load 230 is connected in parallel across the DC bus 175. Power delivered to the DC loads 230 is rectified from AC-to-DC only one time between the utility mains 205 and the DC load 230. In one embodiment, a processing unit 405 includes an array of disks, an interconnect card, and an uninterruptible power supply with a battery.

In various implementations, each DC load 230 may have similar circuits or different circuits. Various ones of the DC loads may provide primarily data storage, data processing, data communication, or a combination of these or other functions. In one embodiment, the DC loads 230 are located on multiple trays in the rack 125. In another embodiment, the entire processing unit 405 is located on one of the trays 110. In some embodiments, the UPS 115 is included on a single tray 110 with the processing unit 110. In other embodiments, the UPS 115 may be located elsewhere on the rack 125. Processing unit 405 may refer to a one or more trays, racks, or other structure containing one or more DC loads 230, which structure may include at least one bay, cabinet, portable or stationary building, or an entire facility, such as the data center 105, for example.

Figure 5A:
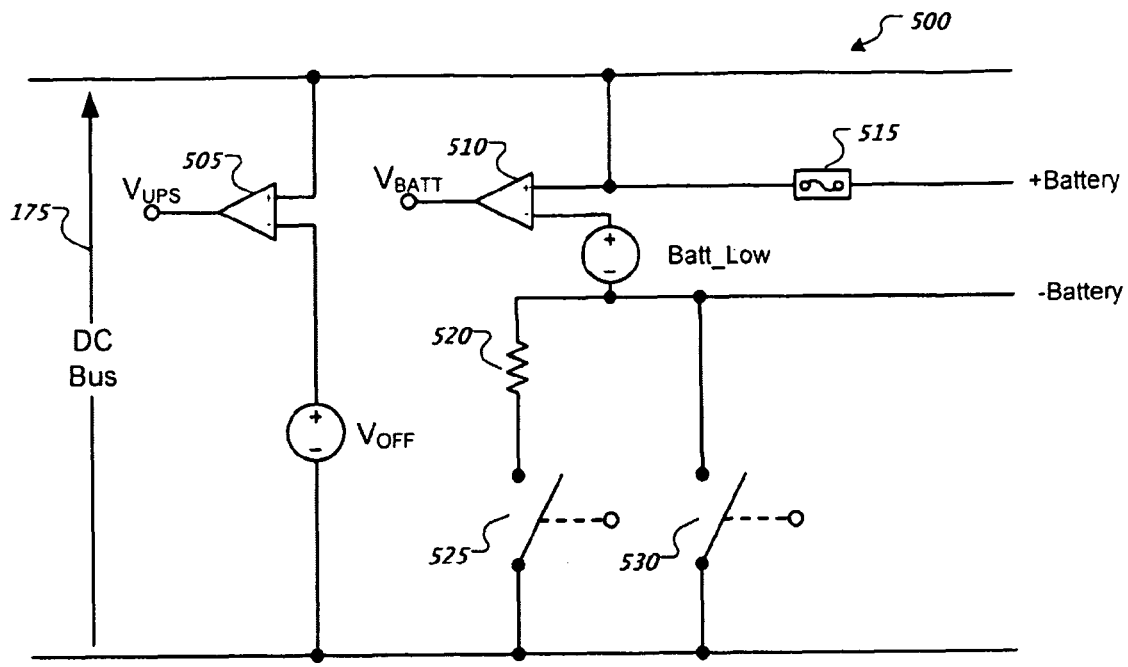
FIGS. 5A-5B are schematic diagrams showing details of a battery circuit in an exemplary power distribution architecture.
Figure 5B:
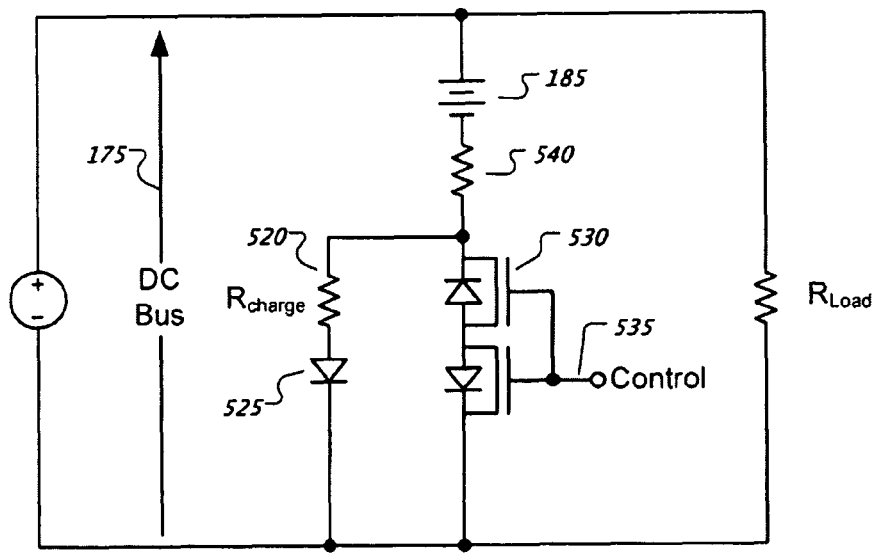

FIGS. 5A-5B are schematic diagrams showing details of a battery circuit in an exemplary power distribution architecture.

FIG. 5A shows an exemplary schematic 500 for a portion of the charge/discharge control circuit 305, which is described with reference to FIG. 3. The schematic 500 includes a comparator circuit 505 to toggle a signal Vups when the voltage on the DC bus 175 falls below a threshold, Voff. The schematic 500 also includes a comparator circuit 510 to toggle a signal VBatt when the voltage on the DC bus 175 falls below a threshold, Batt_Low. The signals Vups and Vbatt are described in additional detail with reference to FIGS. 6-7.

The schematic 500 further includes an over-current protection element 515, which in this example includes a fuse. One terminal of the fuse 515 connects to a positive terminal of the battery, and the other terminal connects to a positive rail of the DC bus 175. In other examples, additional series and/or shunt devices to provide over-current, over-voltage, reverse protection, EMI mitigation, and/or other functions.

In the depicted embodiment, a pair of terminals (+Battery, −Battery) is connectable to a battery. The negative battery terminal (−Battery), connects to two parallel paths, each of which is controllable by operation of a switch. One of the parallel paths connects the negative battery terminal to a negative rail of the DC bus 175 through a resistor 520 and a switch 525. This path permits a charging current to flow when the switch is closed. The amplitude of the charging current is substantially limited by the value of the resistance 520 and the difference between the voltage on the DC bus 175 and the battery (not shown). The internal resistance of the battery is typically much less than the value of the resistance 520. In some applications, the voltage drop across the resistance 520 may be used to measure and/or control the charging current.

The other parallel path connects the negative battery terminal to a negative rail of the DC bus 175 through a switch 530. When the switch 530 is closed, the battery is operatively connected across the DC bus 175. In this state, the battery can discharge and supply operating power to any DC loads (not shown) that are also connected across the DC bus 175.

The switches 525, 530 may be passive and/or actively controlled. An exemplary embodiment, shown in FIG. 5B, is illustrative of one implementation, and is not to be taken as limiting.

In FIG. 5B, the battery 185 is modeled with a series resistance 540 that may represent internal and/or contact resistance, for example. The ideal switch 525 (FIG. 5A) for charging the battery is implemented as a diode with no active control input. In this implementation, the AC-to-DC converter 170 (not shown) may regulate the DC bus 175 to a voltage that is sufficient to forward bias the diode (switch) 525 over temperatures of interest and to provide a desired charging current. As such, the set point may be at least the maximum charging voltage plus a diode drop voltage.

In the depicted example of FIG. 5B, the battery charging current is determined, at least in part, by a series resistance and a unidirectional current mechanism, such as a diode or other semiconductor switch, for example. In other embodiments, the battery charger may include a series-pass regulator (e.g., low drop out (LDO) linear regulator) or a switch mode power converter (e.g., buck, boost, buck-boost, Cepic, Cuk, flyback, charge pump, or resonant, etc.), either alone or in combination. The battery charge current may be controlled by current mirror techniques, or using current measurement feedback techniques involving current sense resistance or inductive coupling measurement, for example.

The ideal switch 530 (FIG. 5A) for discharging the battery is implemented as a back-to-back MOSFET (metal oxide semiconductor field effect transistor) switch configured to block current in both directions when in a non-conductive state. This switch 530 opens and closes in response to a control signal 535 that may be generated, for example, by the controller 245 (FIG. 3), for example. In various embodiments, the switches 525, 530 may include Schottky diodes, insulated gate bipolar transistors (IGBTs), or other semiconductor or electro-mechanical switches (e.g., relays).

Figure 6:
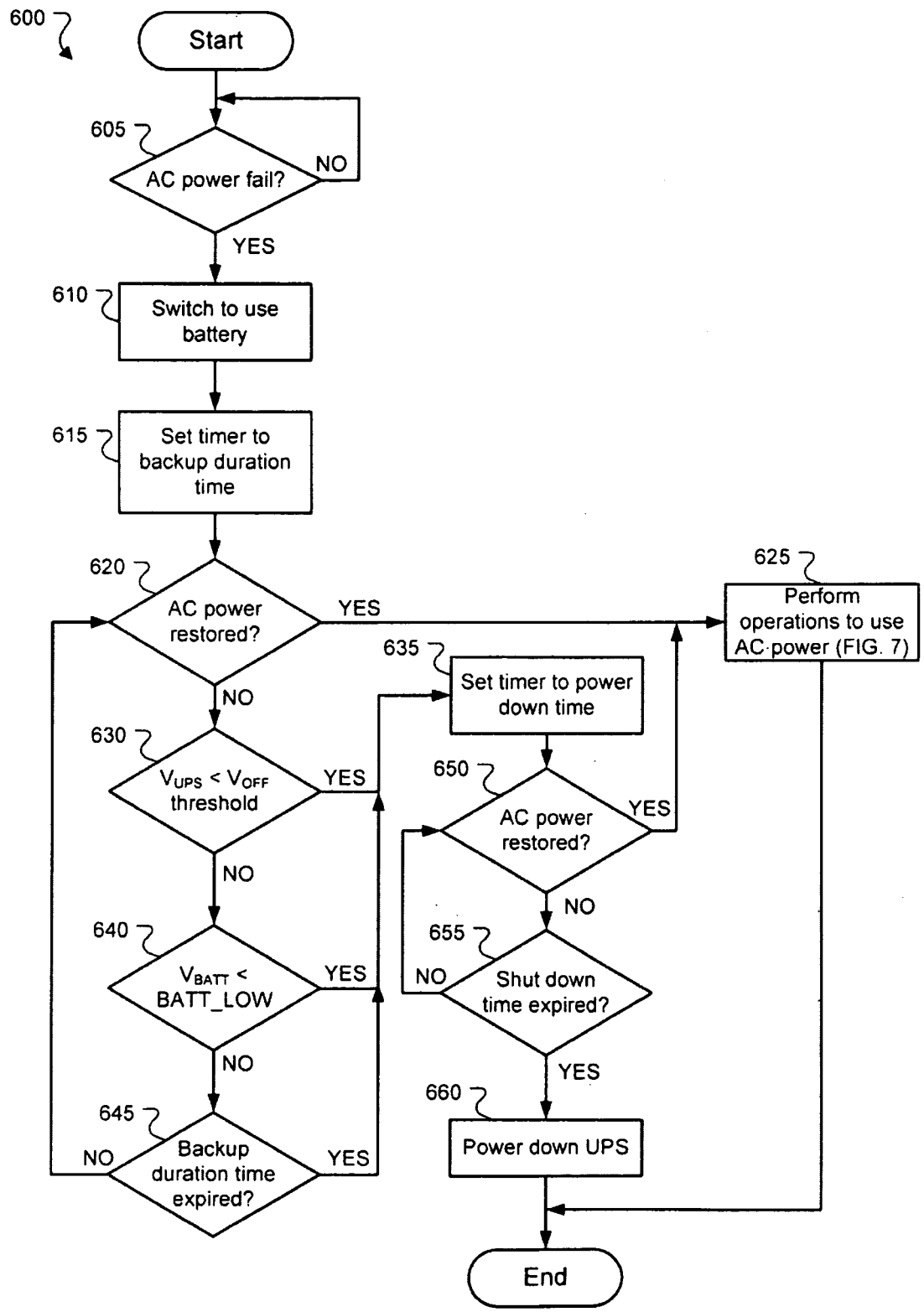
FIGS. 6-7 are flow diagrams illustrating exemplary methods that may be performed in embodiments of the power distribution architecture.
Figure 7:
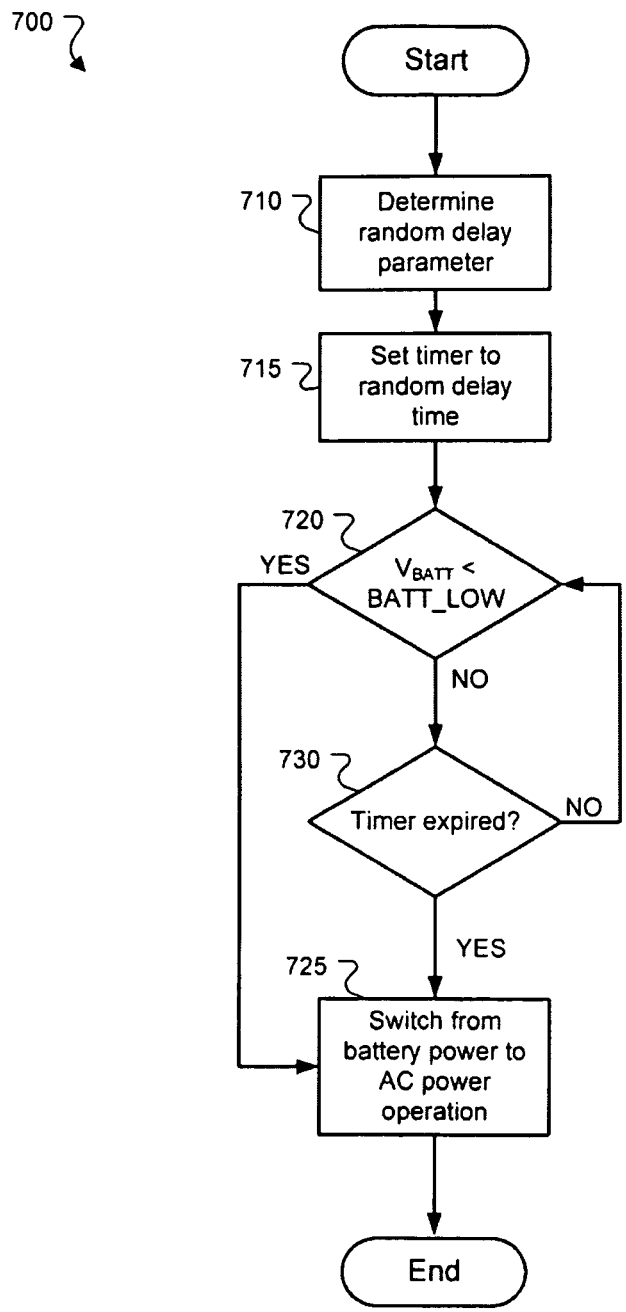

FIGS. 6-7 are flow diagrams illustrating exemplary methods that may be performed in embodiments of the power distribution architecture.

Referring to FIG. 6, a flowchart 600 illustrates an exemplary method that the UPS 115 may perform to handle a fault condition on the AC input voltage signal. In some embodiments, the UPS 115 may perform the method to coordinate switchover to and/or from the battery as a temporary power source. In some cases, performing the method may substantially reduce and/or prevent performance disruptions (e.g., data errors) as a consequence of the AC fault condition. For example, the battery 185 may provide sufficient operating power to maintain operation of the DC loads 230 until an AC source, such as the utility mains 205 or backup generators 210, 215, can be brought on-line. In some embodiments, the battery 185 may continue to provide operating power while the DC loads 230 execute instructions to perform graceful power-down operations. Such graceful shutdown operations can vary widely, but generally attempt to mitigate performance disruptions that could result from the fault condition. Such disruptions may, for example, manifest themselves as stale data when the processing system is subsequently restarted.

Generally, the method includes operations that may be performed by a controller (e.g., the controller 245). The operations may further be performed under the control, supervision, and/or monitoring of one or more of the processors 160 in the system 100. Operations may also be supplemented or augmented by other processing and/or control elements that may be in operative communication with the controller through a network connection 140 coupled to the tray 110. Some or all of the operations may be performed by one or more processors executing instructions tangibly embodied in a signal. The processing may be implemented using analog and/or digital hardware or techniques, either alone or in cooperation with one or more processors executing instructions.

The method begins at step 605 when the controller determines that there is a fault on the AC input voltage signal. For example, the controller may identify the occurrence of AC power failures by monitoring, for example, the AC bus 225, a voltage status condition signal provided by a voltage monitoring/fault detection circuit on the tray 110, and/or an output voltage (e.g., $V_{UPS}$ in FIG. 5A) at the DC bus 175. In some embodiments, the UPS 115 may include an analog to digital converter that converts $V_{UPS}$ into a digital value (e.g., a 10 bit digital value). When the controller detects that a key voltage drops below a threshold, the controller may initiate an AC power fault routine. In other embodiments, the controller may receive signals from an external component, such as a power combiner in the AC switchgear 220. Such signals may indicate a failure in the AC input voltage signal. In other embodiments, the AC-to-DC converter 170 may send a message to the controller to indicate an AC power fault.

If the controller determines that the AC power is not faulted, then step 605 is repeated. If the controller determines that the AC power is in a fault condition, then, in step 610, the controller switches the UPS 115 from AC operation to battery operation. For example, the controller may send signals to open the switch 525 and to close the switch 530 (FIG. 5A) to operatively connect the battery 185 across the DC bus 175 such that the battery 185 can support the DC loads 230. Next, in step 615, the controller sets a timer to a backup duration time. The timer may be a register in the controller to decrement or increment as time advances. In some embodiments, the backup duration time may represent a duration that the battery power may be used or relied upon. For example, the controller may compute the backup duration time using an estimate of an expected battery life, less the time required for the DC loads 230 to perform graceful power down operations. In other embodiments, the controller may load the backup duration time from the NVM 310. In step 620, the controller determines whether the AC power is restored. For example, the controller may receive a message from the AC-to-DC converter about the present status of the AC input power. As another example, the controller may poll the AC-to-DC converter to determine whether the AC power is restored. If the controller determines that the AC power is restored, then the controller may perform operations in step 625 to switch back to operating from AC power, and the method 600 then ends. An exemplary method for switching from battery power to AC power is described in further detail with reference to FIG. 7.

If, at step 620, the controller determines that the AC power is not restored, then in step 630 the controller checks whether $V_{UPS}$ is less than a minimum voltage for battery backup ($V_{OFF}$). If the controller determines that $V_{UPS}$ is less than $V_{OFF}$, then the controller may set the timer to a power down time in step 630. For example, the power down time may be an estimation of the time required for the DC loads to perform the power down operations. In some examples, the power down operations of the DC loads may prevent data loss and/or avoid damage due to sudden loss of DC power. If, in step 630, the controller determines that $V_{UPS}$ is not less than $V_{OFF}$, then, in step 640, the controller may determine whether an output voltage of the battery ($V_{BATT}$) is less than a battery low threshold (BATT_LOW). In some embodiments, when $V_{BATT}$ is lower than BATT_LOW, it may indicate that the power stored in the battery is low and proper power down operations may be executed to prevent data loss, for example. If the controller determines that $V_{BATT}$ is less than BATT_LOW, then the step 635 is performed. If the controller determines that VBATT is not less than BATT_LOW, then the controller may check whether the backup duration time is expired. If the controller determines that the backup duration time is expired, then the step 635 is performed. If the controller determines that the backup duration time is not expired, then the step 620 is repeated.

After the controller sets the timer to the power down time in step 635, the controller may check whether the AC power is restored in step 650. If the controller determines that the AC power is restored, then the step 625 is performed. If the controller determines that the AC power is not restored, then the controller determines whether the power down time is expired in step 655. If the controller determines that the power down time is not expired, then the step 650 is repeated. If the controller determines that the power down time is expired, then the controller may, in step 660, power down the UPS (e.g., open the switch 530 in FIG. 5) and the method ends.

FIG. 7 shows a flow chart that illustrates an exemplary method 700 of operations for switching from battery backup power to AC input power. For example, a controller may switch from battery operation to AC operation after AC power is restored after an AC power failure (e.g., see step 625 of FIG. 6), or after a maintenance operation (e.g., a battery test operation).

In some embodiments, the controller may delay the transfer from battery power operation to AC power operation to mitigate, for example, high peak (e.g., inrush) currents into the data center 105. A small fixed delay may further be provided to ensure that the AC input voltage is stable.

As described with reference to step 625 (FIG. 6), the method 700 may begin when the controller determines that the AC input power is restored. First, in step 710, the controller may determine a random delay parameter. For example, a random delay parameter may be stored in the NVM 310 that represents a length of time (e.g., time, clock cycles) to delay (e.g., 1 ms, 0.5 ms, 0.025 ms, etc.) before switching to AC powered operation.

In some embodiments, the random delay parameter may be randomly or pseudo-randomly determined. For example, the controller may generate a pseudo-random delay parameter using a seed (e.g., a serial number stored in a memory register on the UPS 115 and/or the motherboard 120, a machine time when the tray is first started-up, etc.). The delay parameter may then be used by the controller 245 and/or stored in the NVM 310. In another example, the delay parameter may be a random number (e.g., recorded from a physical process such as radioactive decay) that is stored in the NVM 310 during manufacturing process of the UPS 115.

In one embodiment, the controller sets a timer to the random delay at step 715. In other embodiments, the controller may monitor the delay using a counter, a real time clock, an analog ramp or decay circuit with a threshold comparator, or other suitable delay device. Then, the controller determines, in step 720, whether $V_{BATT}$ is less than BATT_LOW. If $V_{BATT}$ is less than BATT_LOW, indicating that the battery is running out of charge, then the controller may switch from battery power to AC power in step 725 and the method 700 ends. For example, the controller may switch off battery power by opening the switch 530 in the circuit 500 (FIG. 5A). In the exemplary data center 105, it is unlikely that all the batteries will reach a discharge limit at the same time, so this method is not expected to substantially increase peak currents on the AC input voltage lines in most embodiments.

If $V_{BATT}$ is not less than BATT_LOW in step 725, then, in step 730, the controller checks whether the timer has expired. If the specified delay is not reached, then the step 725 is repeated. If the specified delay is reached, then the step 720 is repeated and the method 700 ends.

In various embodiments, the battery voltage may be above and/or below the regulated voltage on the DC bus. In some embodiments, the AC-to-DC converter may regulate to a set point voltage that is within 50, 100, 200, 250, 400, 500, . . . , 1000 mV of the battery's nominal fully charged voltage. In various implementations, the regulation set point may be dynamically determined, for example, based on battery characteristics, such as the age, usage history, temperature, internal resistance, charge time response, discharge time response, or other battery circuit-related characteristics. If the battery voltage is above the set-point voltage, then the charger may include a step-up and/or buck-boost type converter circuit.

In some embodiments, a tray 110 may be a modular support structure configured to be mounted in one of a number of locations, slots, or positions in the rack 125. Each tray 120 may include a substrate, such as a printed circuit board (PCB), on which the UPS 175 and the motherboard 120 and/or other DC loads 230 may be integrated. The trays 110 may provide features for a thermal management system, including ports for air flow, when installed in one of the racks 125. The term "tray" is not intended to refer to a particular arrangement, but instead refers to any arrangement of computer-related components coupled together to serve a particular purpose, such as on a motherboard. Trays may be generally mounted parallel to other trays in a horizontal or vertical stack, so as to permit denser packing than would otherwise be possible with computers having free-standing housings and other components. The term "blade" may also be employed to refer to such apparatuses. Trays may be implemented in particular configurations, including as computer servers, switches (e.g., electrical and optical), routers, drives or groups of drives, and other computing-related devices.

Embodiments of the UPS 115 may be configured to accept various primary or secondary battery technologies. Technologies may include, but are not limited to sealed lead acid, nickel metal hydride, nickel cadmium, wire wound lead acid, alkaline, and lithium ion. The UPS 115 may include circuitry to auto-detect battery chemistry, and adapt charging and discharge profile information according to the determined battery characteristics. In some embodiments, the set point to which the AC-to-DC converter 170 regulates the DC bus 175 may be responsive to the auto-detected battery characteristics. In various embodiments, the battery voltage may be between about 8 Volts and about 26 Volts, such as about 9, 10, 11, 12, 13, . . . , 23, 24, or 25 Volts.

For example, a nominal 12 Volt lead acid battery may have a corresponding set point regulation on the DC bus of about 13.65 Volts, for example, to provide for substantially fully charging the battery. In the event of a switchover from 13.65 Volts regulation on the DC bus to battery voltage, the transient step (in this case, a drop) in voltage on the input to the DC load will be relatively small, such as less than 1 Volt, for example. Such a small change in the input voltage may substantially mitigate adverse transients in the DC loads.

The battery 185 may be a single cell, or a combination of cells arranged in series and/or parallel. In some embodiments, one or more batteries in a UPS may be hot swappable in modes other than battery back-up mode in which the battery is discharging into the load during a fault condition on the AC bus 225. A visual or audible indicator may be provided to alert service personnel whether the battery may be hot swapped.

When mounted on a tray 110, a battery may be located and supported for quick and convenient replacement. Various quick connect/quick disconnect wire harnesses (e.g., Fast-on style connectors), spring-biased electrical contacts, snap features, locking tabs, or the like may be employed to retain batteries for secure connection and quick replacement.

AC mains voltage, as used herein, may refer to AC voltage sources that typically have a fundamental frequency between about 47 Hz and about 500 Hz, without being necessarily so limited. Sources of AC voltage may be derived from stationary or mobile sources, examples of which may include AC generators on transport vehicles, trucks, trains, ships, aircraft, or the like. AC generators include, for example, sources of electric power that substantially derive from coupling a timevarying magnetic field to one or more conductors to produce a substantially sinusoidal voltage. In some implementations, a magnetic field is rotated relative to one or more conductive windings. In some other implementations, one or more conductive windings are rotated relative to a stationary magnetic field.

The AC-to-DC converter 170, being the only AC-to-DC rectification in the power path from the AC generator to the DC load 230, may include features to reduce harmonic distortion, mitigate conducted emissions, manage inrush current, and the like. Accordingly, the converter 170 may incorporate hardware, software, or a combination thereof, to provide power factor correction, spread spectrum (e.g., frequency hopping) switching frequency, filtering, and/or current controlled start-up, for example.

Regulation of the DC bus voltage output by the converter 170 may be accomplished by employing any suitable switching converter and control strategy for providing the single output voltage at a determined set point. Switching topologies may include, but are not limited to, forward, flyback, Cuk, SEPIC, buck, buck-boost, or any suitable resonant or quasi-resonant AC-to-DC converter. In one illustrative embodiment, the AC-to-DC rectification and conversion is accomplished, at least in part, with appropriate operation of an active switching matrix having four controllable switches that modulate the AC input voltage applied to an inductive element in a buck arrangement. In another illustrative embodiment, the AC input voltage is rectified by an uncontrolled diode rectifier stage, followed by a magnetically coupled DC-to-DC conversion stage using a forward or flyback topology, for example. In yet another illustrative example, a power factor input stage is followed by one or more cascaded step-down DC-to-DC converter stages to yield the regulated voltage at the determined set point. Linear regulation may be used in combination with switch-mode power conversion. From this disclosure, one of ordinary skill in the art will recognize a number of implementations for the AC-to-DC converter 170.

With reference for example to FIG. 4 as an illustrative example, some embodiments of the system 400 may operate in any of at least four modes. In a first mode, the processing unit 405 is shut down, as is the UPS 115. In a second mode, the battery 185 is charged using power received from the DC bus 175. In this second mode, the battery 185 may fast charge or trickle charge according to a charging algorithm. In a third mode, the battery is "floated" being effectively disconnected from the DC bus and neither charging nor discharging while the AC-to-DC converter supplies operating power to the DC load 230. In a fourth mode, the battery is operatively connected to the DC bus 175, and discharges to supply operating power to the DC loads 230. This fourth condition may be initiated in response to a fault condition on the AC bus 225.

In various implementations, transfers between voltage sources may involve certain transition sequences. The AC switchgear 220 (FIG. 2), for example, may transfer between any of the generators 205, 210, 215 using either a substantially make-before-break or a substantially break-before-make transfer sequence. When switching from AC input operation to battery operation, the UPS 115 may, in some embodiments, disable operation of the AC-to-DC converter before, substantially during, or after the battery 185 is connected across the DC bus 175. If all the converter 175 output current passes through a series diode, for example, then the converter 175 may be disabled by simply disabling operation of the DC-to-DC switching at the switch-mode controller (not shown). In other embodiments, the output may be actively disconnected by a semiconductor switch, for example.

A number of embodiments have been described. Nevertheless, it will be understood that various modifications may be made without departing from the spirit and scope of the disclosed embodiments. For example, advantageous results may be achieved if the steps of the disclosed techniques were performed in a different sequence, if components in the disclosed systems were combined in a different manner, or if the components were replaced or supplemented by other components. Accordingly, other embodiments are within the scope of the following claims.

What is claimed is:

1. A controller for managing an uninterruptible power supply (UPS) comprising an AC-to-DC converter and at least one DC power source, the controller implemented by one or more hardware devices configured to perform operations comprising:
   detecting a fault condition in an AC input voltage received by the UPS from an electrical main AC source;
   in response to the fault condition, electrically connecting the DC power source across the DC bus, the DC power source providing a DC output voltage across the DC bus;
   electrically disconnecting the DC power source from across the DC bus in response to termination of the fault condition;
   electrically connecting the AC-to-DC converter across the DC bus, the AC-to-DC converter adapted to perform AC-to-DC conversion between the electrical main AC source and the DC bus, the AC-to-DC converter providing the DC output voltage across the DC bus; and
   regulating the DC output voltage from the AC-to-DC converter to a voltage level above and substantially near a set point associated with the DC power source.

2. The controller of claim 1, wherein the set point comprises at least one of:
   a static voltage set point;
   a dynamically determined voltage set point;
   an electrical characteristic of the power source.

3. The controller of claim 1, wherein the DC power source comprises a battery.

4. The controller of claim 3, the operations further comprising in response to a battery test operation, electrically connecting the battery across the DC bus, the battery providing a DC output voltage across the DC bus.

5. The controller of claim 1, the operations further comprising:
   receiving a signal indicative of termination of the fault condition in the AC input voltage;
   subsequent to receipt of the signal, initiating a delay time period corresponding to a delay time parameter stored in a data store; and
   subsequent to the delay time period, regulating the DC output voltage from the AC-to-DC converter to a voltage level above and substantially near a set point associated with the power source.

6. The controller of claim 5, the operations further comprising generating a pseudo-random value for the delay time parameter based on at least one of a serial number of at least one component of the UPS or a start-up machine time of at least one DC load component electrically connected to the DC bus.

7. The controller of claim 1, wherein detecting a fault condition in the AC input voltage comprises:
   monitoring an electrical condition comprising at least one of:
   the AC input voltage;
   a voltage status signal provided by a voltage monitoring circuit electrically connected to the UPS; and
   the DC output voltage; and determining that the monitored electrical condition is indicative of the fault condition.

8. The controller of claim 1, wherein electrically connecting the power source across the DC bus comprises closing a switch electrically connected to the power source and the DC bus, and wherein electrically disconnecting the power source from across the DC bus comprises opening the switch.

9. The controller of claim 1, the operations further comprising:
setting a timer to a backup duration time period;
during the backup duration time period, determining that the DC output voltage is less than a minimum power source voltage;
based on the DC output voltage less than the minimum power source voltage during the backup duration time period, signaling to the at least one DC load component to shut down; and
electrically disconnecting the power source from across the DC bus.

10. The controller of claim 1, wherein regulating the DC output voltage from the AC-to-DC converter to a voltage level above and substantially near a set point associated with the power source comprises regulating the DC output voltage to approximately 1 Volt above the maximum nominal charge voltage of the power source.

11. The controller of claim 1, wherein the DC output voltage comprises a first DC output voltage and the UPS further comprises at least one DC-DC converter, the operations further comprising controlling the DC-DC converter to convert the first DC output voltage to a second DC output voltage distinct from the first DC output voltage.

12. A computer-implemented method for managing an uninterruptible power supply (UPS) comprising an AC-to-DC converter and at least one DC power source, the method comprising:
detecting a fault condition in an AC input voltage received by the UPS from an electrical main AC source;
in response to the fault condition, electrically connecting the DC power source across a DC bus, the DC power source providing a DC output voltage across the DC bus;
electrically disconnecting the DC power source from across the DC bus in response to removal of the fault condition;
electrically connecting the AC-to-DC converter across the DC bus, the AC-to-DC converter adapted to perform AC-to-DC conversion between the electrical main AC source and the DC bus, the AC-to-DC converter providing the DC output voltage across the DC bus; and
regulating the DC output voltage from the AC-to-DC converter to a voltage level above and substantially near a set point associated with the power source.

13. The method of claim 12 further comprising:
receiving a signal indicative of termination of the fault condition in the AC input voltage;
subsequent to receipt of the signal, initiating a delay time period corresponding to a delay time parameter stored in a data store; and
subsequent to the delay time period, regulating the DC output voltage from the AC-to-DC converter to a voltage level above and substantially near a set point associated with the power source.

14. The method of claim 12 further comprising generating a pseudo-random value for the delay time parameter based on at least one of a serial number of at least one component of the UPS or a start-up machine time of at least one DC load component electrically connected to the DC bus.

15. The method of claim 12, wherein detecting a fault condition in the AC input voltage comprises:
monitoring an electrical condition comprising at least one of:
the AC input voltage;
a voltage status signal provided by a voltage monitoring circuit electrically connected to the UPS; and
the DC output voltage; and
determining that the monitored electrical condition is indicative of the fault condition.

16. The method of claim 12 further comprising:
setting a timer to a backup duration time period;
during the backup duration time period, determining that the DC output voltage is less than a minimum power source voltage;
based on the DC output voltage less than the minimum power source voltage during the backup duration time period, signaling to the at least one DC load component to shut down; and
electrically disconnecting the power source from across the DC bus.

17. The method of claim 12, wherein regulating the DC output voltage from the AC-to-DC converter to a voltage level above and substantially near a set point associated with the power source comprises regulating the DC output voltage to approximately 1 Volt above the maximum nominal charge voltage of the power source.

18. The method of claim 12, wherein the DC output voltage comprises a first DC output voltage and the UPS further comprises at least one DC-DC converter, the operations further comprising controlling the DC-DC converter to convert the first DC output voltage to a second DC output voltage distinct from the first DC output voltage.

19. A power distribution system for a data processing rack, comprising:
a mounting rack comprising a plurality of slots adapted to receive a corresponding plurality of trays, each tray comprising a DC load including at least one of a data processing element or a data storage element;
an uninterruptible power supply (UPS) supported by the mounting rack and electrically coupled to at least two of the DC loads on the corresponding two trays of the plurality of trays, the UPS comprising:
an incoming AC bus adapted to receive an AC input power from an electrical main AC source;
an AC-to-DC converter adapted to perform AC-to-DC conversion between the electrical main AC source and a DC bus electrically connected to the DC loads corresponding to the at least two trays, the AC-to-DC converter adapted to provide a DC output power to the DC loads corresponding to the at least two trays during a normal operation state; and
at least one battery electrically connectable across the DC bus and operable to provide the DC output power to the DC loads corresponding to the at least two trays; and
a controller adapted to electrically connect the AC-to-DC converter to the DC bus during the normal operation state and electrically connect the at least one battery to the DC bus in response to a fault condition at the electrical main AC source, the controller adapted to regulate the DC output power from the AC-to-DC converter to a power level above and substantially near a set point associated with the at least one battery.

20. The system of claim 19, wherein the controller is further adapted to:

receive a signal indicative of termination of the fault condition in the AC input power;

subsequent to receipt of the signal, initiate a delay time period corresponding to a delay time parameter stored in a data store; and subsequent to the delay time period, regulate the DC output power from the AC-to-DC converter to a power level above and substantially near a set point associated with the at least one battery.

21. The system of claim 19, wherein the controller resides on the UPS.

22. The system of claim 19 further comprising a voltage monitoring circuit electrically connected to the UPS, wherein the controller is further adapted to:

monitor an electrical condition comprising at least one of:
the AC input power;
a voltage status signal provided by the voltage monitoring circuit; and
the DC output power; and determine that the monitored electrical condition is indicative of the fault condition.

23. The system of claim 19 further comprising a switch electrically connected to the at least one battery and the DC bus, the switch adapted to close to electrically connect the at least one battery across the DC bus and open to electrically disconnect the at least one battery from across the DC bus.

24. The system of claim 19, wherein the controller is further adapted to regulate a DC output voltage to approximately 1 Volt above a maximum nominal charge voltage of the at least one battery.

25. The system of claim 19, wherein the DC output power comprises a first DC output power and the UPS further comprises at least one DC-DC converter, the controller further adapted to manage the DC-DC converter to convert the first DC output power to a second DC output power distinct from the first DC output power.

* * * * *

UNITED STATES PATENT AND TRADEMARK OFFICE
CERTIFICATE OF CORRECTION

| | | |
|---|---|---|
| PATENT NO. | : 8,624,433 B2 | Page 1 of 1 |
| APPLICATION NO. | : 12/432567 | |
| DATED | : January 7, 2014 | |
| INVENTOR(S) | : William H. Whitted et al. | |

It is certified that error appears in the above-identified patent and that said Letters Patent is hereby corrected as shown below:

On the title page item (75) Inventors, line 8: please delete "Plaeffikon, CH" and insert therefor -- Pfaeffikon, CH --.

Signed and Sealed this
Seventeenth Day of June, 2014

Michelle K. Lee
*Deputy Director of the United States Patent and Trademark Office*